Jan. 8, 1935.  S. J. FINN  1,986,925
BELT AND METHOD OF MAKING IT
Filed Dec. 17, 1930  2 Sheets-Sheet 1
Fig. 1.
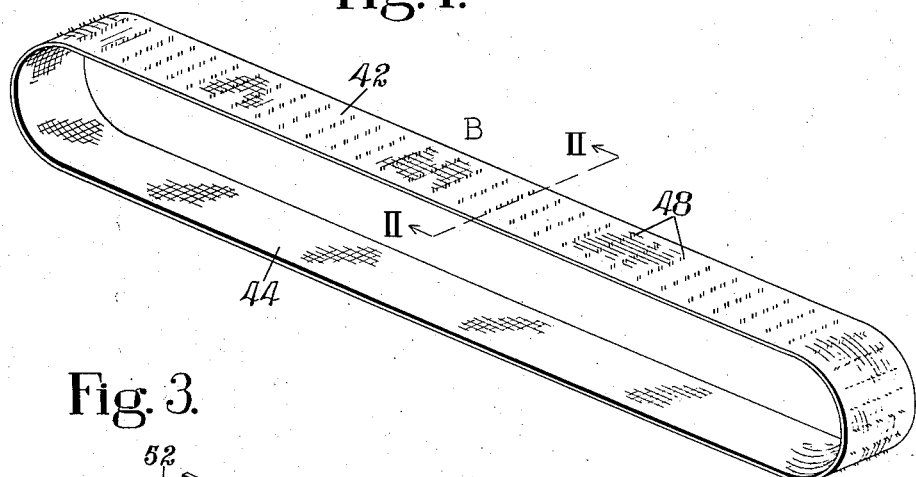
Fig. 3.
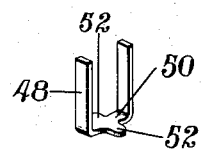
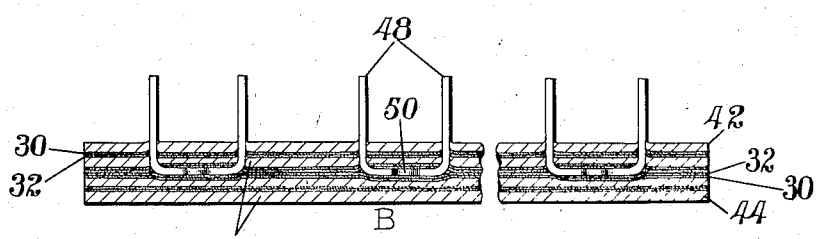
Fig. 2.
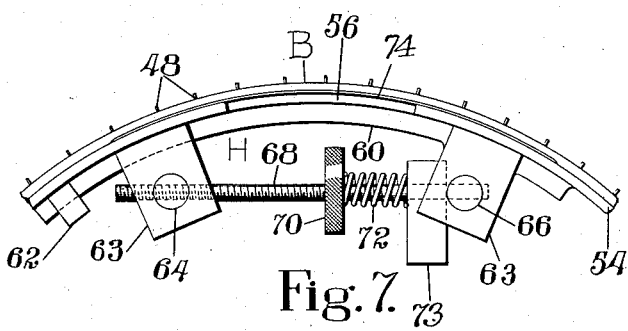
Fig. 7.
INVENTOR
Sidney J. Finn
By his Attorney,
Harlow M. Davis Jan. 8, 1935. S. J. FINN 1,986,925
BELT AND METHOD OF MAKING IT
Filed Dec. 17, 1930   2 Sheets-Sheet 2
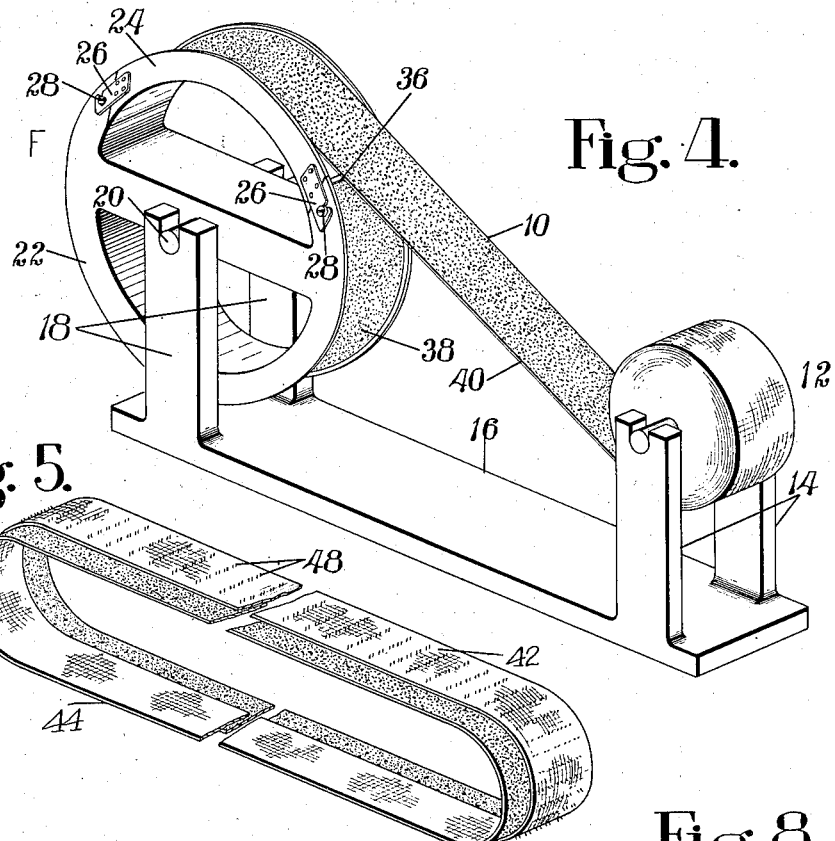
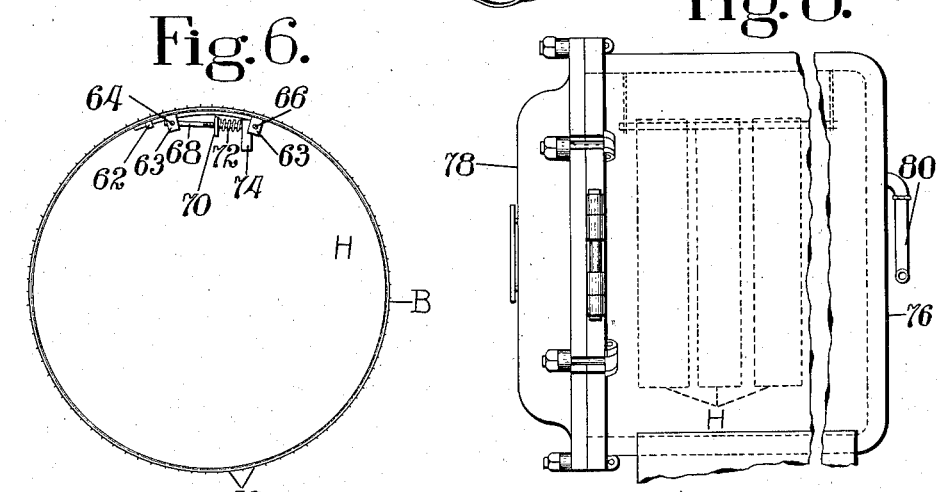
INVENTOR
Sidney J. Finn
By his Attorney
Harlow M. Davis Patented Jan. 8, 1935

1,986,925

UNITED STATES PATENT OFFICE 1,986,925

BELT AND METHOD OF MAKING IT

Sidney J. Finn, Beverly, Mass., assignor to United Shoe Machinery Corporation, Paterson, N. J., a corporation of New Jersey Application December 17, 1930, Serial No. 503,091

31 Claims. (Cl. 154—4)

This invention relates to belts and the manner of their production. It is of particular utility in connection with such belts as are employed in work-piece-inverting mechanisms associated with cementing machines.

In Letters Patent of the United States No. 1,719,175, granted July 2, 1929, on an application filed in my name, is disclosed an inverting arrangement for cemented shoe-soles, which comprises two endless belts, each having projections from its outer surface, these belts receiving coated work-pieces between their adjacent faces with the coated sides down and delivering said pieces with the coated sides up, as a result of turning through 180° between their receiving and delivering ends. If canvas or like textile material is used in the customary belt-form, flanged pulleys are necessary for their support and retention, but the turn of the belts may cause their edges to press against the flanges, so said edges become crushed and softened, until the belts ride over the flanges and are thrown from the pulleys. Rubber belts, when new, will remain upon crowned pulleys more satisfactorily than canvas belts, but stretch as a result of use and are apt to run off their supports. This stretching also loosens the work-engaging projections, and they may fall from the belts. With any type of belt made endless by the lapping and cementing together of its ends, the play and stresses to which these inverting devices are subjected are peculiarly liable to cause their separation.

My invention has as an object the provision of a strong and durable belt free from such objections as just indicated. As herein illustrated, my improved belt comprises a novel arrangement of coiled inner and outer sections with an adhesive substance securing together adjacent convolutions of each section and the sections to each other. The body of each section preferably consists of textile material, canvas webbing for example, and the adhesive substance may be vulcanizable, as rubber or a rubber compound. As herein disclosed, the webbing carries upon one face a layer of rubber cement, upon which is superposed a layer of rubber. This coating secures the convolutions of each section and connects the sections, when such independent portions are employed. Through one of the belt-sections, and this is the broader aspect of the invention regardless of the manner in which the sections are formed and secured to each other, project work-engaging means, which I have shown as furnished by staples, such means having a portion between the belt-sections. Belts so constructed possess great strength, neither breaking nor becoming distorted in use, and their work-engaging projections are firmly held against displacement.

Another object of this invention is to produce, in an efficient manner, belts of the character just outlined. To this end, I form two coils or belt-sections of strip-material, join the convolutions of each coil, assemble these coils one within the other, and connect them as a unitary belt. Each coil may be wound upon a collapsible form, from which it is removed for assembling. The strip is preferably coated with an adhesive, as rubber or other vulcanizable substance, the uncoated side being out when said strip is wound upon the form. In the particular method disclosed, pressure is applied to the convolutions of the coil to join them. Two of the formed coils are assembled one within another and subjected to pressure, which may be both internal and external. In the preferred procedure, the source of internal pressure is an expansible holder, upon which the assembled coils or belt-sections are placed, while the external force may be supplied by fluid-pressure in an inclosing chamber. By introducing the fluid into the chamber at a vulcanizing temperature, the adhesive joining the convolutions of the coils and said coils to each other may be treated chemically, to perfect the connection simultaneously with the mechanical treatment by pressure. For equipping the belt with work-engaging projections, these are mounted upon the outer coil or section, extending outwardly therefrom. If staples are employed to furnish these projections, the legs are inserted through the outer section, and the yokes contact with both this and the inner section. My improved belt may be produced in this way economically, while the resulting article has all its elements securely joined in a durable manner.

In the accompanying drawings is illustrated a particular form of the belt of this invention, together with means by which it may be made. Here, Fig. 1 shows my improved belt in perspective;

Fig. 2 is a broken transverse sectional detail on the line II—II of Fig. 1;

Fig. 3 shows one of the work-engaging staples in perspective;

Fig. 4 illustrates in perspective the step of forming the constituent coils;

Fig. 5 similarly exhibits the step of assembling two coils or sections;

Fig. 6 is a side elevation of the holder for the assembled coils;

Fig. 7 is an enlarged detail in side elevation of the expanding device of the holder; and Fig. 8 is a broken side elevation of the vulcanizing chamber.

In making a belt B in accordance with this invention, a strip of material 10 (Fig. 4), equal in width to that of the completed article and preferably of such textile material as canvas webbing, is taken from a reel 12, which may be rotatably mounted on standards 14 rising from a base 16. Other standards 18, spaced upon the base from the reel, support the journals 20 of a flanged cylindrical form F. This form is collapsible, having a main or body-portion 22 and a section 24 normally secured in place by slotted plates 26 fixed to the section and engaged by bolts 28 passing through openings in the body. With the portions of the form attached to each other, as illustrated in Fig. 4, the device is ready for a winding operation, and then, by loosening the bolts 28, the section 24 may be allowed to move inwardly, so reducing the diameter of the form that the coiled material may be removed. The strip 10 is coated upon one side with such an adhesive as thin rubber cement, indicated at 30 in Fig. 2. This coating to some extent penetrates the fabric, and upon this is placed a second coating 32 of rubber, both of these being vulcanizable. The strip is led from the reel 12 and secured to the complete form F, as is indicated at 36, the coated or adhesive side being outward. The form is then rotated until one convolution of the strip has been applied, and as the winding of the second turn progresses, a thin rubber cement or a rubber solvent, as benzine, is placed upon the coated surface 38 of the first convolution and a thicker rubber cement upon the uncoated surface 40 of the second. This causes them to adhere more perfectly. A coil of two turns having been thus formed and cut transversely to separate it from the supply, the layers may be pressed together, as by rolling, after which the form is collapsed by loosening the screws 28 and moving in the section 24, and the completed coil removed. A second coil 44 is similarly produced, and one of these coils or belt-sections, as 42, after it has been turned with the coated side in, is supplied with work-engaging projections. An effective device for this purpose consists of a staple, such as is illustrated in Fig. 3 of the drawings. The belt-section 42 having been prepared for their reception by being perforated at the desired points, the legs 48 of the staples are inserted through the perforations, with the yokes 50 resting against the coated surface 40, which, in this staple-carrying portion, is at the inside. The yokes of the staples may lie either transversely or longitudinally of the belt, spaced from one another as is most effective. Lateral projections 52, at opposite sides of each staple-yoke at the center aid, by their contact with the surfaces of the section 42 and the companion section 44 when brought together, in preventing the legs from tipping and furnish better engagement with the coating of the sections.

The section 42 carrying the projections and the section 44 are now assembled, the latter being inside the former and with the coating 32 outward for contact with the staple-yokes 50 and with the corresponding coating upon the associated section. Each coated face has been preliminarily treated with thin rubber cement or a rubber solvent. This assembling operation is illustrated in Fig. 5.

One within the other and with their edges registering, the sections are placed upon an expansible holder H, in the form of a flexible ring 54, as appears in Figs. 6 and 7. The adjacent ends of the ring are spaced from each other and to them are secured blocks 63, 63. From one of the blocks is a segmental extension 60 projecting within the adjacent end of the ring and guided between spaced lugs 62 projecting inwardly from said ring. This prevents lateral displacement of the ends. Projecting at one side of the blocks are rotatable studs 64 and 66, through each of which is a transverse opening. A rod 68 is threaded through the stud 64 and has a smooth portion guided in the stud 66. Threaded upon the rod is a collar 70, and between this and the stud 66 is interposed a helical spring 72. Bridging the space between the ends of the ring 54, and attached to said ring at one extremity, may be situated a thin plate 74. This gives a contact-surface for the belt, where it would otherwise be unsupported. With the belt in place upon the holder H, the latter may be quickly expanded by inserting a slotted spacing block 73 between the stud 66 and the spring 72, and further outward pressure may be applied to the supported belt by turning the collar 70 upon the rod. The pressure thus produced upon the work is substantially uniform about its circumference and is radial with respect to the axis of the holder.

One or more of the composite belts B thus arranged upon holders H are placed in a chamber 76 (Fig. 8), the removable head 78 of which is so applied that the connection to the outer air is sealed. Then there is introduced into the chamber through a pipe 80, under a pressure, say of thirty pounds, a fluid, which may be steam or air, at a temperature which will effect the vulcanization of the rubber and rubber compound between the belt-sections and their convolutions. This fluid-force acts positively and oppositely to the expansion of the holder H, or inwardly toward the center, the two effectively pressing together all the layers of the belt-sections to produce their uniform adhesion. At the same time, the heat of the fluid vulcanizes the rubber interposed between the layers to harden and render it more permanent.

After the required time of treatment, the holder or holders H are removed from the chamber and the belt from each holder, said belt being ready for use. It is, as appears in Fig. 2, composed of four plies of webbing 10, each ply being joined to that adjacent to it by the cement 30, which is capable of penetrating the fabric, and by the superposed body of rubber 32, both the cement and rubber being vulcanized. This arrangement is such that both convolutions of the coils and the sections furnished by said coils will not separate in use, and, while sufficiently flexible to run upon a crowned pulley, it effectively resists deformation. As neither the inner nor outer surfaces of the belt carries an adhesive coating, the friction between the adjacent inner surfaces of associated belts, where these make their inverting turn in use, will be minimized, and drops of cement from the coated work-pieces conveyed will have little tendency to stick to the outer surfaces. Secured by the insertion of both legs in the outer belt-section, with their yokes and yoke-projections contacting at one side with said outer section and at the opposite side with the inner section, and embedded in multiple layers of vulcanized rubber, the work-engaging projections are positively held against displacement in all directions.

Having described my invention, what I claim as new and desire to secure by Letters Patent of the United States is:

1. An endless belt comprising an inner section with a plurality of convolutions of textile material having a coating of an adhesive substance upon the outer surface of the convolutions, and an outer section with a plurality of convolutions having a coating of an adhesive substance upon the inner surface of the convolutions, the belt at its interior and exterior presenting surfaces of the textile material and the sections having substantially uniform engagement with each other across their entire width.

2. An endless belt comprising an inner section with a plurality of convolutions of textile materials having a coating of a vulcanizable substance upon the outer surface of the convolutions and a thinner coating of such substance upon the inner surface, and an outer section with a plurality of convolutions having a coating of a vulcanizable substance upon the inner surface of the convolutions and a thinner coating of such substance upon the outer surface.

3. A belt comprising a coiled inner and an outer section, there being an adhesive substance securing together adjacent convolutions of each section and the sections to each other, and work-engaging means projecting through the outer section and contacting with the inner section.

4. An endless belt comprising inner and outer sections, work-engaging means projecting through one of the sections and having a portion between said sections, and vulcanized rubber connecting the sections.

5. A work-inverting belt for cementing apparatus comprising coiled webbing carrying upon one face a rubber compound and a superposed coating of rubber upon the rubber compound, the coated face of one convolution of the belt being secured to the adjacent convolution by rubber cement.

6. A work-inverting belt for cementing apparatus comprising inner and outer sections each consisting of coiled webbing carrying a rubber compound and a superposed coating of rubber thereon, and rubber cement securing the convolutions of each section to each other and the two sections together.

7. A work-inverting belt for cementing apparatus comprising inner and outer sections each consisting of coiled webbing carrying upon one face superposed coatings of rubber and a rubber compound, the coated faces of the two sections being in contact.

8. A work-inverting belt for cementing apparatus comprising inner and outer sections each consisting of coiled webbing carrying upon one face superposed coatings of rubber and a rubber compound, the coated faces of the two sections being in contact, and rubber cement connecting the coated faces of the sections.

9. A work-inverting belt for cementing apparatus comprising inner and outer sections each consisting of coiled webbing carrying upon one face superposed coatings of rubber and a rubber compound, the coated faces of the two sections being in contact, and rubber cement connecting the coated and uncoated faces of the convolutions of each section to each other and connecting the coated faces of the sections.

10. A work-inverting belt for cementing apparatus comprising inner and outer sections each consisting of coiled webbing coated with vulcanizable material, and staples having their legs projecting through the outer section and their yokes contacting with the inner section.

11. A work-inverting belt for cementing apparatus comprising inner and outer sections each consisting of coiled webbing coated with vulcanizable material, and staples having their legs projecting through the outer section and their yokes contacting with the inner section, the yokes of said staples being provided with opposite lateral extensions.

12. The method of making belts, which consists in forming two coils of strip-material, joining the convolutions of the coils, assembling the coils one within the other, and connecting the coils to furnish a unitary belt.

13. The method of making belts, which consists in winding a coil of strip-material on a collapsible form, connecting the convolutions of the coil by an adhesive, collapsing the form and removing the coil, winding a second strip of material upon a collapsible form, connecting the convolutions of the second coil by an adhesive, collapsing the form and removing the second coil, assembling the coils one within the other, and connecting said coils by an adhesive.

14. The method of making belts, which consists in forming two coils of strip-material, joining the convolutions of the coils, mounting work-engaging projections upon one coil, assembling the coils one within the other with the projections extending outwardly from the outer coil, and connecting the coils to furnish a unitary belt.

15. The method of making belts, which consists in winding coated material upon a form, treating the coating to increase its adhesion as the winding progresses, pressing the convolutions of the coil together, and removing the coil from the form.

16. The method of making belts, which consists in winding coated material upon a form, treating the coating to increase its adhesion, pressing the convolutions of the coil together upon the form, and removing the coil from the form.

17. The method of making belts, which consists in winding upon a form webbing coated upon its outer side with a vulcanizable substance, applying cement to the adjacent surfaces of the first and second convolutions of the coil, pressing the convolutions together, and removing the coil from the form.

18. The method of making belts, which consists in assembling endless belt-sections one within another, pressing the sections together by a force exerted outwardly against the inner section, and simultaneously applying to the outer section a force exerted inwardly and effective while the outward force is inactive.

19. The method of making belts, which consists in assembling endless belt-sections of coated material one within another, placing the sections upon an expansible holder, and causing the expansion of the holder.

20. The method of making belts, which consists in assembling endless belt-sections of coated material one within another, placing the sections upon an expansible holder, causing the expansion of the holder, and simultaneously applying a force to the outer section acting toward the holder.

21. The method of making belts, which consists in winding a coil of coated strip-material, placing the coil upon an expansible holder, causing the expansion of the holder, placing the holder and coil within a chamber, and creating fluid-pressure in said chamber.

22. The method of making belts, which consists in assembling endless belt-sections of material coated with an adhesive one within another, placing the sections upon a holder, placing the holder and section within a chamber, and creating fluid-pressure in said chamber.

23. The method of making belts, which consists in winding material coated with an adhesive to form two belt-sections, treating the outer and inner surfaces of the respective sections to increase their adhesion, assembling the sections with the adhesive surfaces in contact, and applying to the inner section a force exerted outwardly.

24. The method of making belts, which consists in winding coated webbing upon a form to furnish two belt-sections, the coating of one section being at the outer side and the coating of the other section at the inner side, removing each section from its form, assembling the sections upon an expansible holder with the coated faces in contact, and causing the expansion of the holder.

25. The method of making belts, which consists in winding material coated with an adhesive to form two belt-sections, inserting staples in one of the sections with the legs projecting outwardly, treating the outer and inner surfaces of the respective coils to increase their adhesion, assembling the coils with the adhesive surfaces in contact and the staple-legs at the outside, and applying to the inner section a force exerted outwardly.

26. The method of making belts, which consists in winding material coated with an adhesive to form two belt-sections, treating the outer and inner surfaces of the respective coils to increase their adhesion, assembling the coils with the adhesive surfaces in contact, applying to the inner section a force exerted outwardly, and simultaneously applying to the outer section a force exerted inwardly.

27. The method of making belts, which consists in winding coated webbing upon a form to furnish two belt-sections, the coating of one section being at the outer side and the coating of the other section at the inner side, removing the two sections from the form, assembling them upon an expansible holder with the coated faces in contact, causing the expansion of the holder, placing the holder and sections in a chamber, and creating fluid-pressure in said chamber.

28. The method of making belts, which consists in winding a coil of material coated with rubber, and applying to the coil simultaneously a vulcanizing temperature and pressures effective to force the material of the coil in opposite directions.

29. The method of making belts, which consists in winding a coil of material coated with rubber, and submitting the coil simultaneously to the pressure of a fluid at a vulcanizing temperature and to an independent pressure exerted from within the coil outwardly.

30. The method of making belts, which consists in winding two coils of webbing having their convolutions connected by rubber, assembling the coils one within the other, placing the assembled coils upon an expansible holder, causing the expansion of the holder, placing the holder in a chamber, and introducing into the chamber fluid under pressure and at a vulcanizing temperature.

31. The method of making belts, which consists in winding two coils of webbing having their convolutions connected by rubber, inserting staples through one coil with their legs extending outwardly and their yokes resting against the coated surface, assembling the coils one within the other, the coated surface of the inner coil contacting with the staple-yokes, placing the assembled coils upon an expansible holder, causing the expansion of the holder, placing the holder in a chamber, and introducing into the chamber fluid under pressure and at a vulcanizing temperature.

SIDNEY J. FINN.